United States Patent
Hays et al.

(10) Patent No.: US 10,616,145 B2
(45) Date of Patent: Apr. 7, 2020

(54) MESSAGE GROUPING AND RELEVANCE

(71) Applicant: Microsoft Technology Licensing, LLC, Redmond, WA (US)

(72) Inventors: Boyd Hays, Kirkland, WA (US); Imran Masud, Bellevue, WA (US); Cindy Kwan, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 458 days.

(21) Appl. No.: 15/199,028

(22) Filed: Jun. 30, 2016

(65) Prior Publication Data
US 2018/0006973 A1   Jan. 4, 2018

(51) Int. Cl.
| | | |
|---|---|---|
| *H04L 12/58* | (2006.01) | |
| *H04L 29/08* | (2006.01) | |
| *G06F 16/335* | (2019.01) | |
| *G06F 16/9535* | (2019.01) | |

(52) U.S. Cl.
CPC ............ *H04L 51/02* (2013.01); *G06F 16/335* (2019.01); *G06F 16/9535* (2019.01); *H04L 51/20* (2013.01); *H04L 51/26* (2013.01); *H04L 51/32* (2013.01); *H04L 67/02* (2013.01); *H04L 67/306* (2013.01)

(58) Field of Classification Search
CPC ....... H04L 67/306; H04L 51/02; H04L 67/02; H04L 51/26; H04L 51/20; H04L 51/32; G06F 17/3064; G06F 17/30867; G06F 16/9535; G06F 16/335; G06Q 50/01; G06Q 10/10
See application file for complete search history.

(56) References Cited

U.S. PATENT DOCUMENTS

| | | |
|---|---|---|
| 6,119,014 A | 9/2000 | Alperovich et al. |
| 7,107,544 B1 | 9/2006 | Luke |
| 7,698,335 B1 * | 4/2010 | Vronay ............. G06F 17/30038 707/737 |
| 7,716,593 B2 | 5/2010 | Durazo et al. |
| 7,941,491 B2 | 5/2011 | Sood |
| 8,065,369 B2 | 11/2011 | Turski et al. |
| 8,793,319 B2 | 7/2014 | Turski et al. |

(Continued)

OTHER PUBLICATIONS

Gibson, Tom, "How NEO Improves Microsoft Outlook Productivity", In White Paper, May 10, 2004, pp. 1-14.

(Continued)

*Primary Examiner* — Soe Hlaing
(74) *Attorney, Agent, or Firm* — Schwegman Lundberg & Woessner, P.A.

(57) ABSTRACT

Systems, methods, and computer-readable media for providing grouped data of interest. In some configurations, a computing device can include a user interface with one or more groups configured to receive messages. The groups can be computer-defined groups, such as by the computing device or other system, or user-defined groups. Techniques and technologies described herein receive a message in the one or more groups, and determine a message relevance (e.g., utility) based on the content and/or context (e.g., time of day, sender, geo-location of recipient, message urgency, etc.) of the message. In some configurations, the message relevance can be based, at least in part, on the particular group or a cluster of groups to which the message is associated.

18 Claims, 10 Drawing Sheets

(56) References Cited

U.S. PATENT DOCUMENTS

| | | | |
|---|---|---|---|
| 9,152,307 B2 | 10/2015 | Coleman et al. | |
| 2002/0087649 A1 | 7/2002 | Horvitz | |
| 2003/0020749 A1* | 1/2003 | Abu-Hakima | G06Q 10/10 |
| | | | 715/752 |
| 2008/0028031 A1 | 1/2008 | Bailey et al. | |
| 2009/0319911 A1 | 12/2009 | McCann et al. | |
| 2010/0121925 A1 | 5/2010 | Champlin-Scharff et al. | |
| 2010/0235367 A1* | 9/2010 | Chitiveli | G06F 17/30707 |
| | | | 707/752 |
| 2011/0040843 A1* | 2/2011 | Kussmaul | G06Q 10/107 |
| | | | 709/206 |
| 2012/0149342 A1 | 6/2012 | Cohen et al. | |
| 2012/0296919 A1* | 11/2012 | Sinha | H04L 67/22 |
| | | | 707/749 |
| 2013/0268597 A1 | 10/2013 | Van Hoff | |
| 2013/0290339 A1 | 10/2013 | LuVogt et al. | |
| 2015/0254572 A1 | 9/2015 | Blohm et al. | |
| 2015/0324451 A1* | 11/2015 | Cormack | G06N 99/005 |
| | | | 706/11 |
| 2015/0339373 A1* | 11/2015 | Carlson | G06F 17/30601 |
| | | | 707/737 |
| 2016/0224655 A1* | 8/2016 | Oliver | H04L 51/18 |
| 2016/0226811 A1* | 8/2016 | Kerschhofer | H04L 51/26 |

OTHER PUBLICATIONS

Leclaire, Jennifer, "Newsfactor", Published on: Aug. 31, 2010, Available at:http://www.newsfactor.com/story.xhtml?story_id=10300A9RT0PS#, 5 pages.

"International Search Report and Written Opinion Issued in PCT Application No. PCT/US2017/038906", dated Aug. 16, 2017, 13 Pages.

\* cited by examiner

MESSAGE GROUPING AND RELEVANCE

BACKGROUND

A vast amount of data is shared across a plurality of sources. The data can be in the form of news, social status updates, conversations, electronic mail, text messages, and the like. While data is readily available from the plurality of sources, users typically have to visit specific sites to access the data. For instance, to access a blog about basketball, a user would have to take the time to visit the blog source in order to access the data. For a user with multiple interests, this process can be cumbersome, time consuming, and overwhelming.

SUMMARY

This disclosure describes systems, methods, and computer-readable media for providing data organization and display. In some examples, a computing device can include a user interface with one or more groups configured to receive data (e.g., electronic messages, messages in a conversation, social media updates, news articles, text messages, etc.), herein referred to as messages. The user interface can provide the user with a single access viewpoint to review information from multiple sources, thus decreasing a number of individual websites and/or messaging systems a user needs to access to receive the information. The groups of the user interface can include an aggregation of related web-based content from various sources. The groups of the user interface can be computer-defined groups, such as by the computing device or other system, or user-defined groups. Techniques and technologies described herein receive a message in the one or more groups, and determine a message relevance (e.g., utility) based on the content and/or context (e.g., time of day, sender, geo-location of recipient, message urgency, etc.) of the message. In some examples, the message relevance can be based, at least in part, on the particular group or a cluster of groups to which the message is associated. A cluster of groups can be an aggregation of related groups. The cluster of groups can be computer-defined and/or user-defined.

Example techniques described herein can apply machine learning to train one or more utility functions to provide an accurate message relevance for the user. Example techniques described herein can apply user selection input with respect to messages in the machine learning model.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to systems, methods, computer-readable instructions, modules, algorithms, hardware logic and/or operations as permitted by the context described above and throughout the document. Furthermore, the claimed subject matter is not limited to implementations that solve any or all disadvantages noted in any part of this disclosure. Additionally, the terms "message" or "incoming message" can be used to represent many different types of messages received at and/or viewed via a computing device, such as electronic mail (email), text messages, conversation messages, blog messages, social media messages, instant messages, a publication, and the like. The terms "relevance" or "utility" can be used to represent a subjective importance of a message to a particular user.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
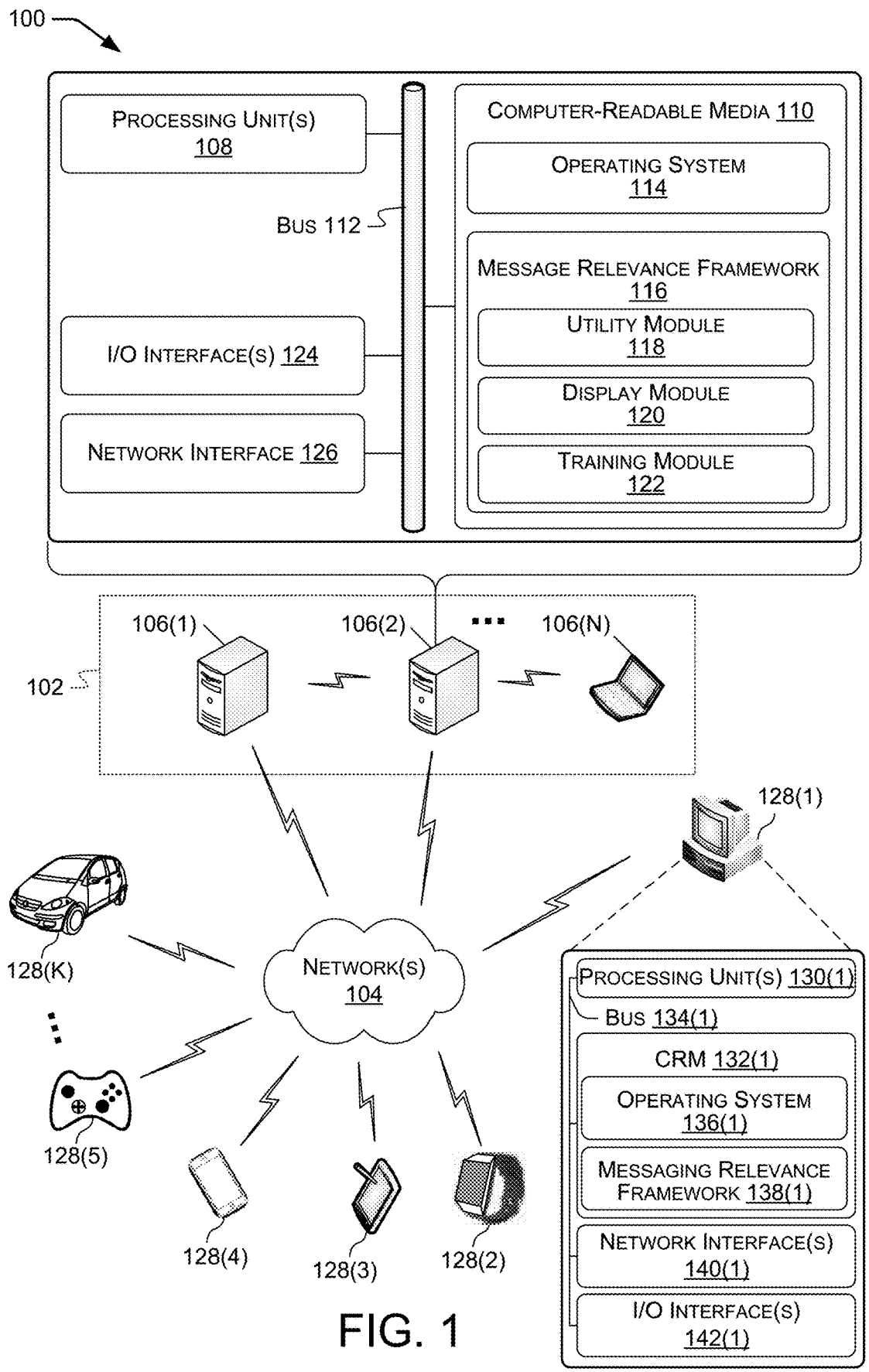
FIG. 1 is a block diagram depicting an example environment in which examples of a message grouping and relevance system can operate.

The technologies described herein provide techniques and constructs to improve message organization and display. In various examples, a computing system can calculate a message relevance (e.g., utility) based on message content and/or context (e.g., time of day, sender, geo-location of recipient, message urgency, etc.). The message relevance can be calculated by using one or more utility functions. The one or more utility functions can be determined based on user preferences, system settings, and/or user actions with respect to previously received messages.

In various examples, the utility function used to calculate message relevance can be determined based upon a group to which the message is associated. A group can be based on participants, a project, a user interest, and the like, and can include an aggregation of related web-based content from various sources. In some examples, groups can be generated by the computing system, such as by using one or more keywords and/or topics associated with the groups and/or contributors to the group. In some examples, groups can be generated by a user. For example, a user may generate a group for a particular work project, including a list of participants. The computing system can recognize a sender of the message being in that list of participants, and/or a context of the message related to the particular work project. Consequently, the computing system can calculate the utility of the message based at least in part on the group related to the particular work project.

In some examples, the utility function used to calculate message relevance can be determined based upon a cluster of groups to which the message is associated. A cluster of groups can be an aggregation of related groups. Similar to the individual groups described above, a cluster of groups can be generated by the computing system, such as by using one or more keywords and/or topics associated with each of the groups in the cluster. In some examples, a cluster of groups can be generated by a user, such as by relating multiple groups to one another. For example, a computing system can generate a cluster of groups by receiving a user selection of multiple sports interest blogs and/or websites into the cluster. In such an example, the cluster may include a tennis blog group, a Four-Wheel Drive (4WD) enthusiast group, a bicycling group, and the like. For another example, a computing system can generate a work cluster of groups by receiving an identification of multiple work projects a user is actively working in, and relating them in a cluster.

In various examples, the computing system can display an alert of relevant messages in a group and/or a cluster of groups. The alert can be in the form of a notification, a message icon, a number of relevant unread messages, and the like. In some examples, the alerts can be determined based on user preferences (e.g., alert for particular senders, particular groups, particular clusters of groups, time of day, etc.). For example, a user may prefer to receive a notification of a new message received in a particular conversation. For another example, a user may prefer to receive a notification of a new message received in a work group during business hours.

Additionally, the computing system can apply machine learning to train one or more utility functions to provide an accurate message relevance for the user. The computing system can receive selection input from a user with respect to messages, and can update utility functions based upon the selection input. For example, the computing system can recognize that messages from a particular sender are selected without delay during business hours. Based on the recognition, a learning module can train the utility function to increase the utility of a message from the particular sender during work hours.

The utility calculation of message relevance with respect to groups and clusters of groups can increase the signal to noise ratio of a messaging user interface. The signal to noise ratio is increased by surfacing (e.g., displaying) messages that are relevant to the viewer. Thus, a messaging system using the utility calculation can be more efficient than previous messaging systems.

Additionally, by clustering groups of messages, the message grouping and relevance system can decrease a number of individual web sites and/or messaging systems a user must access to review all necessary and/or desired information. Thus, the message grouping and relevance system can have the technical advantage of increasing an overall network bandwidth available, as users need not access each individual site to review updated messages. Instead, the user can get a snapshot view of a cluster of groups, and quickly discern which groups have relevant new messages for the user to view.

The message grouping and relevance system can also decrease a time required by the user on a computing device to ensure the user is up-to-date with information. Consequently, the system can result in an improvement to the functioning of the computing device by allowing more computing power to be available to process other programs, as the user will not need to spend as much time accessing each individual website or messaging system to determine whether a message of interest has been published therein. Furthermore, the cluster of groups can decrease a normal multi-screen tiering of folders and/or messages, and flattens it into a single or dual-level user interface. The flattening of the user interface can result in more computing power being available to process other programs because the user will not need to access as many screens as in a multi-screen tiering system.

Illustrative Environment

The environment described below constitutes but one example and is not intended to limit the claims to any one particular operating environment. Other environments can be used without departing from the spirit and scope of the claimed subject matter.

FIG. 1 shows an example environment 100 in which examples of a message grouping and relevance system can operate. In some examples, the various devices and/or components of environment 100 include distributed computing resources 102 that can communicate with one another and with external devices via one or more networks 104.

For example, network(s) 104 can include public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Example embodiments support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(N). Embodiments support scenarios where device(s) 106 can include one or more computing devices that operate in a cluster or other grouped configuration, such as in a Cloud platform. In such embodiments, device(s) 106 can be configured to share resources, balance load, increase performance, provide fail-over support or redundancy, or for other purposes. Device(s) 106 can belong to a variety of categories or classes of devices such as traditional server-type devices, desktop computer-type devices, mobile devices, and/or special purpose-type devices. Thus, although illustrated as desktop and laptop computers, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, telecommunication devices, terminals, personal data assistants (PDAs), game consoles, gaming devices, work stations, media players, set-top boxes, integrated components for inclusion in a computing device, appliances, or any other sort of computing device.

Device(s) 106 can include any type of computing device having one or more processing unit(s) 108 operably connected to computer-readable media (CRM) 110 such as via a bus 112, which in some instances can include one or more of a system bus, a data bus, an address bus, a PCI bus, a Mini-PCI bus, and any variety of local, peripheral, and/or independent buses.

CRM described herein, e.g., CRM 110, include computer storage media and/or communication media. Computer storage media includes tangible storage units such as volatile memory, nonvolatile memory, and/or other persistent and/or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, and/or storage media that can be used to store and maintain information for access by a device 106 or consumer computing device 128.

In contrast to computer storage media, communication media can embody computer-readable instructions, data structures, program modules, or other data in a modulated data signal, such as a carrier wave, or other transmission mechanism. As defined herein, computer storage media does not include communication media.

Executable instructions stored on CRM 110 can include, for example, an operating system 114, a message relevance framework 116, a message utility module 118, a message display module 120, a training module 122, and other modules, programs, or applications that are loadable and executable by processing units(s) 108. Additionally or alternatively, the functionality described herein can be performed, at least in part, by one or more hardware logic components such as accelerators. For example, and without limitation, illustrative types of hardware logic components that can be used include Field-Programmable Gate Arrays (FPGAs), Application-specific Integrated Circuits (ASICs), Application-Specific Standard Products (ASSPs), System-on-a-Chip systems (SOCs), Complex Programmable Logic Devices (CPLDs), etc. For example, an accelerator can represent a hybrid device, such as one from XILINX or ALTERA that includes a CPU embedded in an FPGA fabric.

Device(s) 106 can also include one or more input/output (I/O) interfaces 124 to allow device(s) 106 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). For simplicity, other components are omitted from the illustrated device(s) 106.

Device(s) 106 can also include one or more network interfaces 126 to enable communications between device(s) 106 and other networked devices such as consumer computing device(s) 128 through which a consumer can send and receive messages. Such network interface(s) 126 can include one or more network interface controllers (NICs) or other types of transceiver devices to send and receive communications over a network.

Other devices involved in the message grouping and relevance system can include consumer computing devices 128(1)-128(K). Consumer computing device(s) 128 can belong to a variety of categories or classes of devices such as traditional consumer-type devices, desktop computer-type devices, mobile devices, special purpose-type devices, embedded-type devices, and/or wearable-type devices. Consumer computing device(s) 128 can include, but are not limited to, desktop computers (e.g., 128(1)), laptop computers, thin clients, terminals, or other mobile computers, personal data assistants (PDAs), wearable computers such as smart watches or biometric or medical sensors (e.g., 128(2), represented graphically as a smart watch), implanted computing devices such as biometric or medical sensors, computer navigation consumer computing devices, satellite-based navigation system devices including global positioning system (GPS) devices and other satellite-based navigation system devices), tablet computers or tablet hybrid computers (e.g., 128(3)), smartphones, mobile phones, mobile phone-tablet hybrid devices, or other telecommunication devices (e.g., 128(4)), portable or console-based gaming devices or other entertainment devices such as network-enabled televisions, set-top boxes, media players, cameras, or personal video recorders (PVRs) (e.g., 128(5), represented graphically as a gamepad), automotive computers such as vehicle control systems, vehicle security systems, or electronic keys for vehicles (e.g., 128(K), represented graphically as an automobile), or integrated components for inclusion in computing devices, appliances, or other computing devices configured to participate in or carry out the message grouping and relevance system described herein.

Consumer computing device(s) 128 can represent any type of computing device having one or more processing unit(s) 130 operably connected to computer-readable media (CRM) 132 such as via a bus 134, which in some instances can include one or more of a system bus, a data bus, an address bus, a PCI bus, a Mini-PCI bus, and any variety of local, peripheral, and/or independent buses.

Executable instructions stored on CRM 132 can include an operating system 136, a message relevance framework 138, and other modules, programs, or applications that are loadable and executable by processing units(s) 130. In various examples, the message relevance framework 140 can include an interface for displaying, selecting, editing, and drafting messages. In some examples, the message relevance framework 138 can perform one or more of the functions of the message relevance framework 116 described above. Additionally or alternatively, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Consumer computing device 128 can also include one or more I/O interfaces including one or more network interfaces 140 to enable communications between consumer computing device 128 and other networked devices such as other consumer computing device(s) 128 or device(s) 106 over network(s) 104. Such network interface(s) 140 can include one or more network interface controllers (NICs) or other types of transceiver devices to send and receive communications over a network.

Consumer computing device 128 can also include a I/O interface 142 to enable the device 128 to receive user input and a response to the input. Examples support the I/O interface 142 receiving input from the user, such as, for example, a selection of a message. Additionally or alternatively, the I/O interface 142 can provide a display of messages, groups, and/or the cluster of groups. A group can include an aggregation of related web-based content (e.g., messages) from various sources, and a cluster of groups can include an aggregation of related groups.

Figure 2:
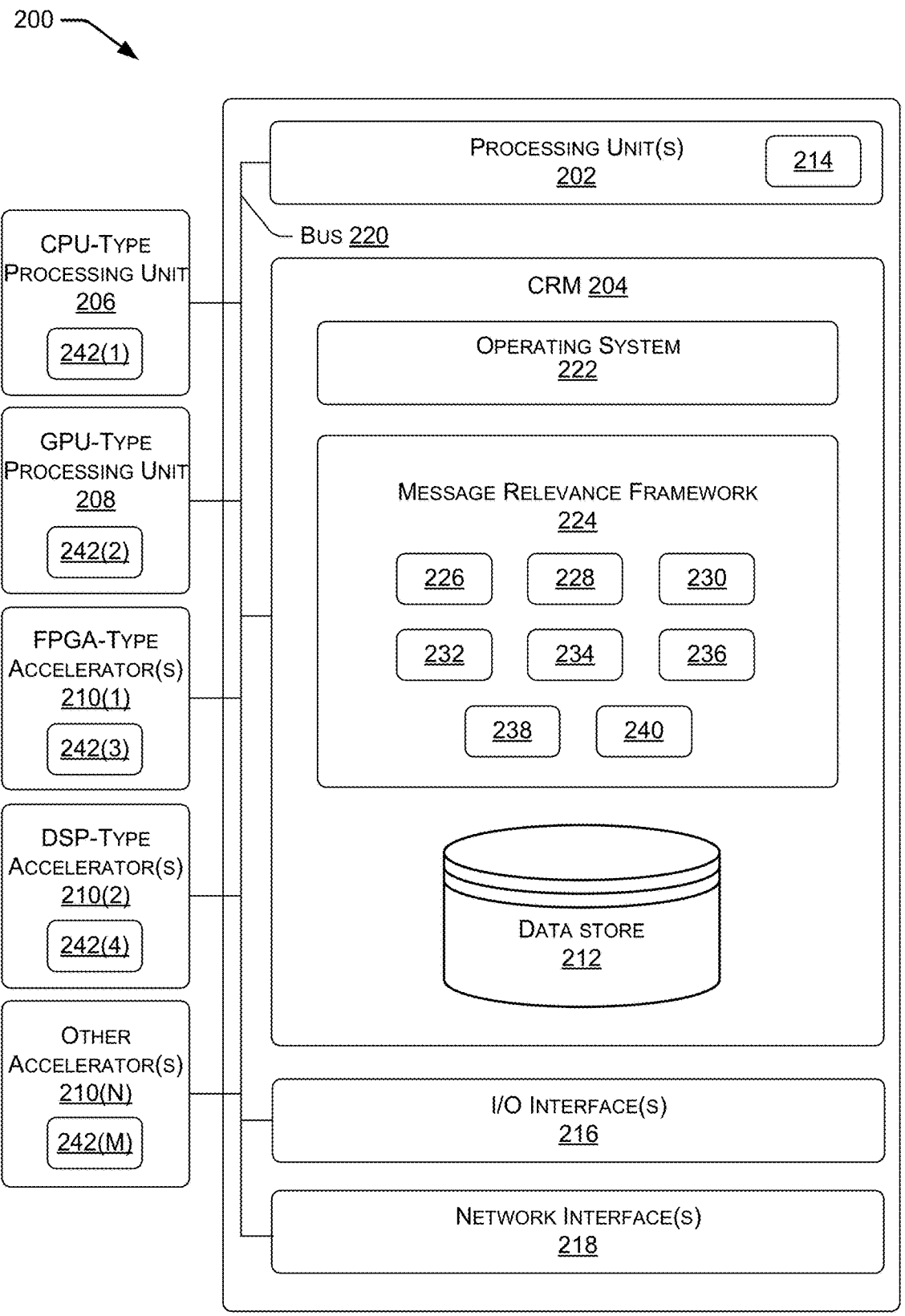
FIG. 2 is a block diagram depicting an example computing device configured to participate in a message grouping and relevance system.

FIG. 2 is a block diagram depicting an example computing device 200 configured to participate in a message grouping and relevance system. In some examples, computing device 200 may be one computing device of a distributed computing resource, such as a device 106 from FIG. 1. In some examples, computing device 200 may be a consumer computing device, such as consumer computing device 128 from FIG. 1. In device 200, processing unit(s) 202, can include processing unit(s) 108 and can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, CRM 204 can represent CRM 110 and can store instructions executable by the processing unit(s) 202, which as discussed above, can represent a processing unit incorporated in device 200. CRM 204 can also store instructions executable by external processing units such as by an external CPU-type processing unit 206, an external GPU-type processing unit 208, and/or executable by an external accelerator 210, such as an FPGA-type accelerator 210(1), a DSP-type accelerator 210(2), or any other accelerator 210(N). In various examples at least one CPU-type processing unit 206, GPU-type processing unit 208, and/or accelerator 210 is incorporated in device 200, while in some examples one or more of a CPU-type processing unit 206, GPU-type processing unit 208, and/or accelerator 210 is external to device 200.

In the illustrated example, CRM 204 also includes a data store 212. In some examples, data store 212 includes data storage such as a database, data warehouse, or other type of structured or unstructured data storage. In some examples, data store 212 includes a corpus and/or a relational database with one or more tables, indices, stored procedures, and so forth to enable data access such as web tables including one or more of hypertext markup language (HTML) tables, resource description framework (RDF) tables, web ontology language (OWL) tables, and/or extensible markup language (XML) tables, for example. Data store 212 can store data and/or instructions for the operations of processes, applications, components, and/or modules stored in CRM 204 and/or executed by processing unit(s) 202. Alternately, some or all of the above-referenced data and/or instructions can be stored on separate memories 214 on board one or more processing unit(s) 202 such as a memory on board a CPU-type processor, a GPU-type processor, an FPGA-type accelerator, a DSP-type accelerator, and/or another accelerator.

Device(s) 200 can further include one or more input/output (I/O) interfaces 216, which can be I/O interface 124/144 to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in device(s) 200, network interface(s) 218, which can be network interface(s) 126/142, can represent, for example, network interface controllers (NICs) or other types of transceiver devices to send and receive communications over a network.

In various examples, one or more of the network interface(s) 218, the I/O interface(s) 216, the CRM 204 and the processing unit(s) 202 can be operably connected via bus 220, which can be bus 112/134. In some examples, bus 220 can include one or more of a system bus, a data bus, an address bus, a PCI bus, a Mini-PCI bus, and any variety of local, peripheral, and/or independent buses.

In the illustrated example, CRM 204 also includes an operating system 222, which can be operating system 114/138. CRM 204 also includes a message relevance framework 224, which can be message relevance framework 116/140. Message relevance framework 224 can include one or more modules and/or APIs, which are illustrated as blocks 226, 228, 230, 232, 234, 236, 238, and 240 although this is just an example, and the number can vary higher or lower. The one or more modules and/or APIs of message relevance framework 224 can be used to determine an organization and/or display of messages (e.g., grouping of messages, clustering of groups of messages, relevance of messages, alerts of messages, etc.).

Functionality described associated with blocks 226, 228, 230, 232, 234, 236 and 238 can be combined to be performed by a fewer number of modules and/or APIs or it can be split and performed by a larger number of modules and/or APIs. For example, block 226 can represent a user preference module with logic to program processing unit 202 of device 200 to deliver one or more user preferences to the message relevance framework 224 for processing. User preferences can be related to a current region, a current location, an intended location, a time of day, a day of week and/or month, a sender, a group to which the message is associated, an urgency of the message, and/or other prioritization preferences.

For example, a user can store a preference to conversations in the region in which the user is located. Thus, if a user travels to a new region, a conversation in the new region may be prioritized over conversations in an old region. For another example, a user can store a preference to messages related to an intended location of travel, such as a party. The user may input the intended location into a navigation system, such as in a vehicle or on a mobile device, and messages related to the intended location may be prioritized. To further illustrate, while en-route to the party, the user may receive a message from the hostess asking for more chips. The computing system may recognize the message from the intended location and/or a person associated therewith, and may surface the message to alert the user of its receipt.

In various examples, the user preferences can be related to clusters of groups (e.g., aggregations of related groups). In such examples, the computing system can apply user preferences across multiple groups, such as for bulk editing and/or configuration. The user preferences can be applied across one or more clusters of groups. For example, a user may select a bulk edit across all clusters to give preferential treatment to any message with the keyword "emergency." For another example, a user with a cluster of groups related to work can store a preference to be alerted to work-related conversations during business hours. As such, each of the groups in the work cluster would be configured with the preference based on the cluster.

In some examples, the user preferences can be related to alerts of relevant messages in a group and/or a cluster of groups (e.g., alert for particular senders, particular groups, particular clusters of groups, time of day, etc.). The alerts can be in the form of a message notification, a message icon, a number of relevant unread messages, and the like. For example, a user may prefer to receive a notification of a new message received in a particular conversation. For another example, a user may prefer to receive a notification of a new message received in a work group during business hours.

Block 228 can represent a system setting module with logic to program processing unit 202 of device 200 to deliver one or more system settings to the message relevance framework 224 for processing. The one or more system settings can be applied in conjunction with or separate from the user preferences described above. In various examples, the system settings can be stored in data store 212. In some examples, the system settings can be stored in an external data store. In such examples, the external data store can be accessible via the network interface(s) 218.

In various examples, the system settings can be a baseline set of rules applied to generate groups and/or clusters of groups. In such examples, the groups and/or clusters of groups can be generated using existing conversations, email accounts, contacts, sources, keywords, descriptions, user-tagged content, and other information. For example, the computing device may automatically generate a news source group including articles from various news sources. For another example, the computing device may generate a work group with contacts bearing the same domain name, such as @mywork.com.

Additionally or alternatively, the system settings can be a baseline set of rules to generate a message utility for the respective groups and/or clusters of groups. In various examples, the message utility can be based on a type of message, an urgency of the message, content in the message, a time of day, a day of the week, user-tagged content, events associated with the message, etc. For example, the computing system may generate a higher message utility for an email than for a blog post. For another example, the computing system may generate a higher message utility for a message containing an invite for an event than for a message with no invite.

Block 230 can represent a grouping module with logic to program processing unit 202 to generate groups and/or clusters of groups. As discussed above, a group can include an aggregation of related web-based content (e.g., messages) from various sources, and a cluster of groups can include an aggregation of related groups. In various examples, the grouping module can receive input via the user preference module and/or the system settings module. In some examples, the grouping module can receive input via a messaging interface to create a group and/or a cluster of groups. The input can include members of a group, keywords associated with groups, groups selected to cluster, a name of the group, and the like. In some examples, the input can include user name and password information associated with relevant sources of the web-based content aggregated in a group. Based on the input, the grouping module can generate a group and/or a cluster of groups for grouping messages.

As an illustrative example, a grouping module may generate a work group with messages from co-workers sharing a common domain name, such as @mywork.com. A user may desire to narrow the group to co-workers who are working on a common project with the user. The grouping module may receive the input of the relevant co-workers, and generate the common project group. For another example, the grouping module can associate work-related groups of messages together in a work cluster. Thus, the user may enjoy easy access to messages related to work without having to access multiple sources, such as email, various conversation sources, Internet activity, and the like.

Block 232 can represent a utility function module with logic to program processing unit 202 to apply one or more utility functions to an input message to determine a message utility (e.g., a value of the message to the recipient). The one or more utility functions can be based on the group and/or cluster of groups to which the input message is associated.

In various examples, the one or more utility functions can be equations including one or more parameters. In some examples, the one or more parameters can be based on input from the settings module and/or user preference module. In such examples, the computing system can receive user preferences and/or system settings and determine the one or more parameters of the utility function equation based at least in part on the received preferences and/or settings. For example, a parameter of a utility function can be a factor that increases the utility of the message based on a particular sender specified in the user preferences. For another example, a parameter of a utility function can be a factor that increases the utility of a message based on a keyword emphasized in the system settings, such as "urgent."

In various examples, the utility function module may adjust the parameters of a utility function, and/or a utility of a message based on input from a machine learning module. In such examples, the utility of the message can be adjusted based on input from one or more I/O interfaces with respect to individual messages. For example, the utility function module may update a parameter of a utility function based on input from the machine learning module indicating that a user consistently selects a message from a particular sender before other messages. Therefore, the resulting utility of a message from the particular sender would be increased compared to a pre-update utility.

Block 234 can represent a message relation module with logic to program processing unit 202 to relate two or more messages. The message relation module can relate messages based on a topic, a keyword, a conversation, a group, sender, and the like. In various examples, the message relation module can adjust the utility of the message based on relation to other messages. For example, if the message relation module determines that two messages are related, such as two messages in the same conversation, the message relation module may increase the utility of the messages based on the relation.

Block 236 can represent a ranking module with logic to program processing unit 202 of device 200 for ranking messages based on overall utility (e.g., utility adjusted for relation). In various examples, the ranking module can rank the incoming messages. In some examples, the ranking module can rank messages with a utility above a threshold utility. In such examples, the ranking module may rank messages determined to be of a threshold relevance to the user. The ranking can be based on the group and/or the cluster of groups to which the message is associated. In some examples, the ranking module can rank a pre-determined number of messages, such as, for example, the top 5 or top 10 messages. In such examples, the pre-determined number of messages can be for a group and/or for the cluster of groups.

In various examples the ranking module can send the ranked messages to a display module for presentation on a display of a user device. For example, the ranking module can rank the top 3 messages in each group of a cluster of groups, and can send the information to the display module for presentation of an indication of the top 3 messages to be presented on a display. For another example, the ranking module can rank the top 10 messages in a cluster of groups, and can send the information to the display module for presentation of an indication of the top 10 messages to be presented on a display. Although the values of 3 and 10 are presented here as examples of the number of ranked messages for display, the number of ranked messages to be displayed in any particular implementation may be any number, depending on design parameters, user preferences, or other factors.

Block 238 can represent a display module with logic to program processing unit 202 of device 200 to display a messaging interface. The messaging interface can include a group, a cluster of groups, a message, and/or an indication of the message (e.g., an alert, a notification, a symbol of a number of unread messages, etc.). In various examples, the messaging interface can further provide a means by which groups and/or clusters of groups can be edited and/or updated (e.g., updated user preferences, change layout, adjust members in a group and/or groups in a cluster). In some examples, the messaging interface can further provide a means by which new messages can be drafted.

Block 240 can represent a machine learning module with logic to program processing unit 202 of device 200 for extraction of input data related to messages, groups of messages and/or clusters of groups. The input data can represent a selection of the message, a length of time the message remained un-read, a disregard of the message, a categorization of the message, a follow-up of the message, a post-receipt message prioritization, and the like. The input data can be received via one or more I/O interfaces 216 of device 200. In some examples, the input data may be stored on computing device 200, such as, for example, in data store 212.

In various examples, the machine learning module can train the system periodically, such as, for example, at a specified time each day. In some examples, the periodic interval can be determined by a program manager (e.g., monthly, weekly, daily). In some examples, the machine learning module can obtain or access data when manually directed by the program manager. In various examples, the machine learning module can train the system continuously. In such an example, the machine learning module can train the utility functions continuously with a substantially continuous collection of input data.

Alternatively, some or all of the above-referenced data can be stored on separate memories 242, such as memory 242(1) on board a CPU-type processing unit 206, memory 242(2) on board a GPU-type processing unit 208, memory 242(3) on board an FPGA-type accelerator 210(1), memory 242(4) on board a DSP-type accelerator 210(2), and/or memory 242(M) on board another accelerator 210(N).

Figure 3:
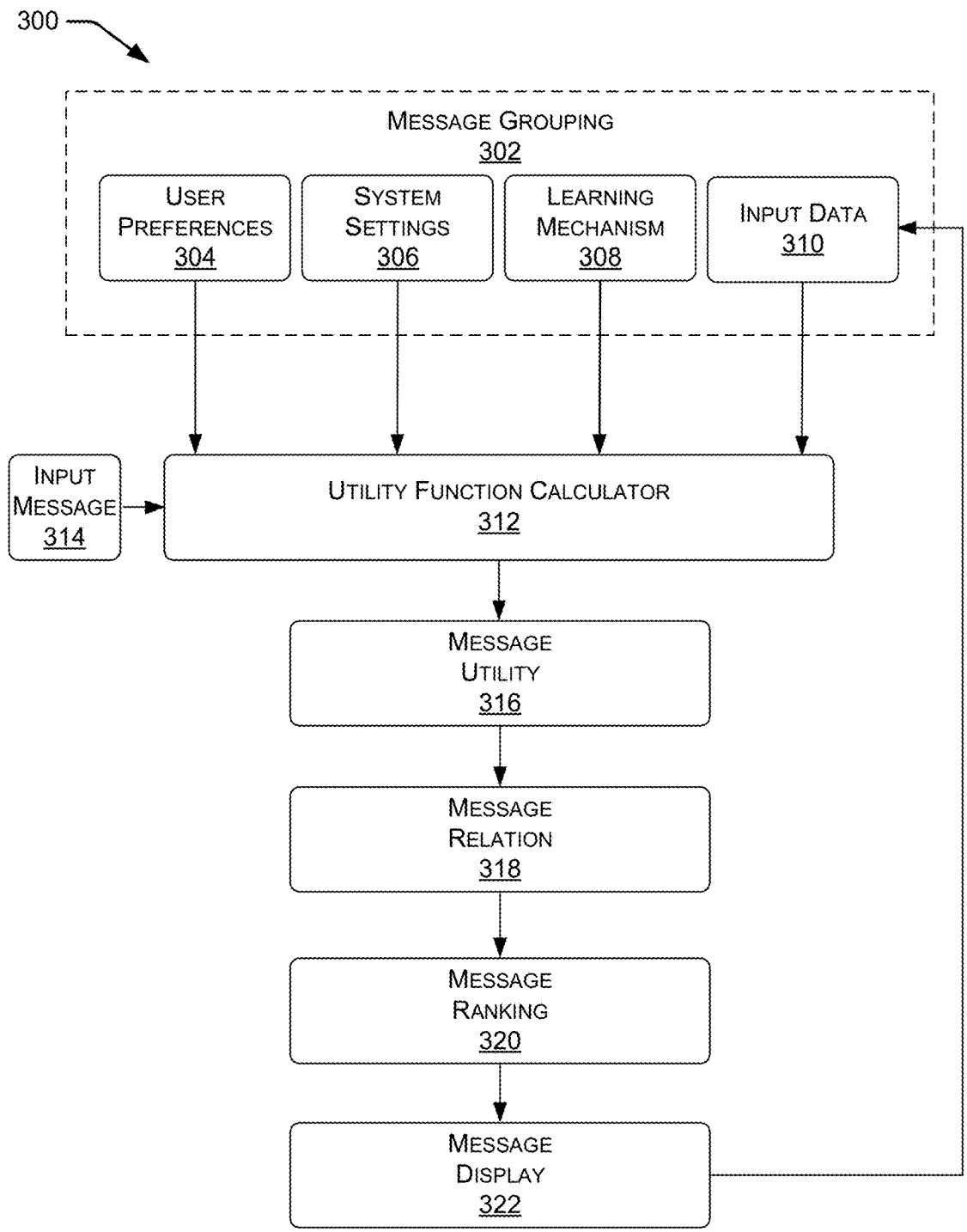
FIG. 3 is a dataflow diagram depicting an example architecture of a process that a message relevance framework can perform to determine a relevance of a message and a display thereof.

FIG. 3 is a dataflow diagram depicting an example architecture 300 of processes that the message relevance framework 116/224 can perform to determine an organization and/or display of messages (e.g., groups of messages, clusters of groups, relevance of messages, alerts of messages, etc.). Messages can be in the form of electronic mail (email), text messages, conversation messages, blog messages, social media messages, instant messages, publications, and the like.

As illustrated in FIG. 3, the message grouping and relevance system processes can begin with message grouping 302. Message grouping 302 can represent creating and/or updating message groups and/or clusters of groups. In some examples, the groups and/or clusters of groups can be generated via a user interface, described in further detail below with regard to FIG. 9. In various examples, groups and/or clusters of groups in the message grouping 302 can be generated by using user preferences 304 and/or system settings 306.

In various examples, the computing system can receive one or more user preferences 304 in the message grouping 302, and can generate groups and/or clusters of groups. User preferences in the generation of groups and/or clusters of groups can be related to sources, locations, keywords, descriptions, topics, (e.g., user interests, projects, etc.), and the like. For example, the computing system may receive user preferences to generate a group of messages from a selection of senders who are co-workers on a particular work project. For another example, the computing system may receive user preferences to generate a cluster of groups including work groups for a plurality of projects in which the user is a part.

Additionally or alternatively, the computing system can receive one or more system settings 306 in the message grouping 302, and can generate groups and/or clusters of groups based on the system settings 306. In various examples, the system settings 306 can generate groups and/or clusters of groups based on keywords, domain names related to messages, existing conversations, user-tagged content, user contacts, frequently accessed social media sites, and the like. For example, the system settings 306 can automatically group together senders from a particular domain, such as @mywork.com, and generate a work group based on the domain.

In some examples, system settings 306 can suggest members to add to a group and/or groups to add to a cluster based upon one or more keywords, recognized user interests, user preferences 304, and the like. For example, the system settings 306 can recognize that a new group generated by a user includes a particular keyword. The system settings 306 may identify two additional groups that share the particular keyword, and may suggest the addition of other relevant groups in the cluster.

In some examples, the groups and/or clusters of groups in the message grouping 302 can be updated via a learning mechanism, which uses machine learning techniques to identify characteristics of messages that are important to a user (e.g., responded to within a threshold time, from a frequently accessed contact), and characteristics of messages that are not as important to a user (e.g., deleted without reading, etc.). The term "machine learning" may refer to one or more programs that learns (e.g., adapts processing) in response to the data it receives. For example, a learning mechanism 308 may build, modify or otherwise utilize a model that is created from input data 310, and can make predictions or decisions using the model. The input data 310 can represent a selection of the message, a length of time the message remained un-read, a disregard of the message, a categorization of the message, a follow-up of the message, a post-receipt message prioritization, and the like. The input data 310 can be processed by the learning mechanism 308 while the computing system is in an online and/or offline mode, via one or more I/O interfaces, such as I/O interface(s) 144/216.

In various examples, the learning mechanism 308 can be used to process the input data 310 in order to improve message groups and/or clusters of groups by adjusting a utility function of the group and/or cluster of groups based on the input data 310. The learning mechanism 308 may be trained using supervised and/or unsupervised learning. For instance, over time, as the learning mechanism 308 receives more input data 310, the computing system can adjust the message utility calculation of a particular group and/or cluster of groups based on the input data 310.

In some examples, the learning mechanism 308 can train the system periodically, such as, for example, at a specified time each day. In some examples, the periodic interval can be configured by a program manager (e.g., monthly, weekly, daily). In some examples, the learning mechanism 308 can obtain or access data when manually directed by the program manager. In various examples, the learning mechanism 308 can train one or more parameters of a utility function (e.g., a message grouping or message clustering algorithm) in order to update the groups and/or clusters of groups.

In some examples, the learning mechanism 308 can train a utility function calculator 312 periodically or continuously with a substantially continuous collection of input data 310. The utility function calculator 312 can generate one or more utility functions for calculating a utility of a message. In some examples, the utility function calculator 312 can generate a utility function for each group in a cluster of groups. In some examples, the utility function calculator 312 can generate a utility function for a cluster of groups. In such examples, the same utility function can be applied to each group in the cluster of groups, thereby providing a means by which the groups in the cluster can be edited en-masse.

In various examples, the one or more utility functions can be parameterized equations. In some examples, the parameters of the one or more utility functions generated by the utility function calculator 312 can be generated and/or derived from the user preferences 304. The user preferences 304 can be related to a current region, a current location, an intended destination, a time of day, a day of week and/or month, a sender, a group to which the message is associated, an urgency of the message, and/or other prioritization preferences.

In some examples, the user preferences 304 can include group-specific parameters to apply to the utility functions. In such examples the parameters based on user preferences 304 can be specified individually for each group. For example, a user can store a preference to conversations in the region in which the user is located (e.g., detected by a location detection device located in a consumer device, such as a global positioning system). Thus, if a user travels to a new region, a conversation in the new region may be prioritized over conversations in a previous region. For another example, a user can store a preference to messages related to an intended location of travel. The user may input the intended location into a navigation system, such as in a vehicle (e.g., 128(K) from FIG. 1) or on a mobile device (e.g., 128(4) from FIG. 1), and messages related to the intended destination may be prioritized. To further illustrate, while en-route to a particular tourist destination, the user may receive a message from a news source indicating activity at the tourist destination. The computing system may recognize the message has a keyword or topic associated with the tourist destination, and may surface the message to alert the user of its receipt.

In some examples, the user preferences 304 can include parameters to apply to the utility functions that are specific to a cluster of groups. In such examples, the parameters generated by user preferences 304 can be applied across all groups in a cluster. For example, a user preference may include a parameter prioritizing new messages in a work group during normal business hours Monday through Friday. For another example, a user preference may include a parameter prioritizing new messages in a social interest group on the weekends.

In various examples, the parameters of the one or more utility functions generated by the utility function calculator 312 can be generated and/or derived from the system settings 306. In such examples, the system settings 306 can be related to a type of message, an urgency of the message, an indication of priority, content in the message, a time of day, a day of the week, user-tagged content, events associated with the message, and the like. For example, the system settings 306 may include a parameter to apply to the utility function calculator 312 that automatically results in an electronic mail message getting a higher utility than a blog post message. For another example, the system settings 306 may include a parameter to apply to the utility function calculator 312 that associates a higher utility for a message containing an invitation for an event.

As illustrated in FIG. 3, the utility function calculator 312 can receive an input message 314. The input message can be assigned to a group and/or a cluster of groups. In some examples, based on the group and/or cluster of groups assignment, the input message 314 can be processed through the utility function calculator 312.

In various examples, the input message can be analyzed by the utility function calculator 312 to determine values to apply to one or more utility functions (e.g., parameterized equations). The utility function calculator 312 can analyze the input message 314 for content, context, sender information, and other relevant parameters for the one or more utility functions. The utility function calculator 312 can then apply the appropriate values to the utility functions and calculate a message utility 316. The message utility 316 can represent a subjective relevance to the user.

In various examples, the message utility 316 can be updated based upon a message relation 318. The message relation 318 can represent a relation of two or more messages in a group and/or a cluster of groups. Two or more messages can be related based on a common topic, keyword, conversation, sender, and the like. Responsive to a determination of relatedness between two or more messages, the message relation 318 can increase the utility of the message, to increase the likelihood that a user will be alerted to its receipt. For example, if the message relation module determines that two messages are related, such as two messages in the same conversation, the message relation module may increase the utility of the messages based on the relation.

In various examples, the computing system can rank an input message 314 relative to other messages in a message ranking 320. The message ranking 320 can be based on the message utility 316 and/or the message relation 318 to one or more other messages. In some examples, the message ranking 320 can rank messages with an overall utility (e.g., message utility adjusted for relation) that is above a threshold utility. In such examples, the ranked messages may be determined to be of a threshold relevance to the user. The threshold utility can be based on a user preference 304 and/or a system setting 306.

In some examples, the message ranking 320 can rank a pre-determined number of messages in a group. For example, the message ranking 320 may rank the top 3 messages in each group. In some examples, the message ranking 320 can rank a pre-determined number of messages in a cluster of groups. For example, the message ranking 320 may rank the top 10 messages in a cluster of groups, with all 10 being in the same group. The pre-determined number of messages can be based on a user preference 304 and/or a system setting 306.

In various examples, the ranked messages can be sent to a message display 322 for presentation on a display of a user device. In some examples, the message display 322 can be a messaging interface including a group, a cluster of groups, a message, and/or an indication of the message (e.g., an alert, a notification, a symbol of a number of unread messages, etc.). In some examples, the message display 322 can be a message interface with clusters of groups. In such examples, the clusters of groups can indicate a number of relevant messages stored in each cluster.

In various examples, the message display 322 can provide a means by which groups and/or clusters of groups can be edited and/or updated (e.g., updated user preferences, change layout, adjust members in a group and/or groups in a cluster). In some examples, the message display 322 can further provide a means by which new messages can be created.

In various examples, the message display 322 can present an indication of a message. The indication of the message can be an alert, a notification, a symbol of a number of unread messages, and the like. In some examples, the indication of the message can include at least a part of the content of the message. In various examples, the indication of the message can be determined based on user preferences 304 and/or system settings 306. For example, a user preference 304 may include a desire to receive notifications of messages from a particular sender. Based on a determination that the input message 314 is from the particular sender, the message display 322 may present a notification of the new message, such as a pop-up notification indicating the receipt.

Additionally, the message display 322 can include a messaging interface for receiving and processing input data 310 from the user. The input data 310 can represent a selection of the message, a length of time the message remained un-read, a disregard of the message, a categorization of the message, a follow-up of the message, a post-receipt message prioritization, and the like. As discussed above, the input data 310 can be processed by the learning mechanism 308 for training the message grouping 302 and/or utility function calculator 312.

Illustrative Processes

FIGS. 4-8 are flow diagrams depicting example processes for a message grouping and relevance system. The operations of the example process are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes.

Figure 4:
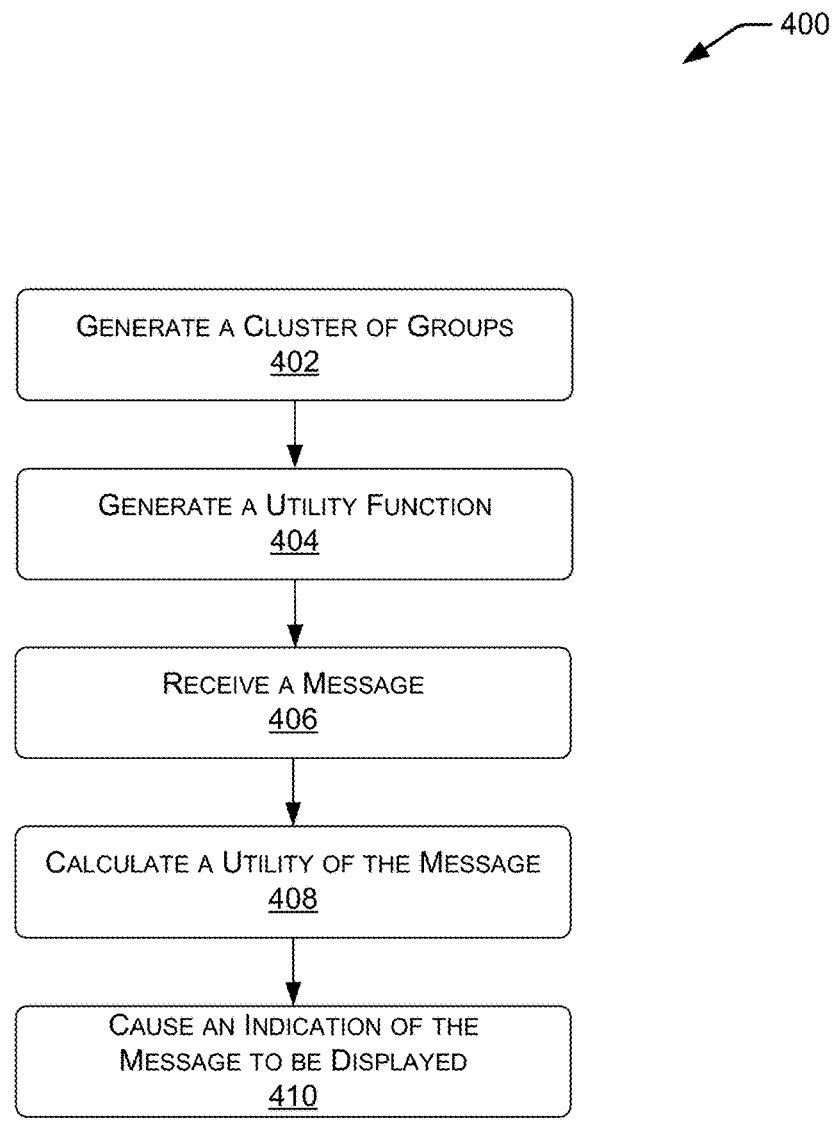
FIG. 4 is a flow diagram that illustrates an example process flow of a message grouping and relevance system.

FIG. 4 is a flow diagram that illustrates an example process flow 400 of a message grouping and relevance system.

At block 402, the computing system can generate a cluster of groups. In various examples, the groups and/or clusters of groups can be generated by applying user preferences and/or system settings. In some examples, the groups and/or clusters of groups can be generated via a user interface. In such examples, the user interface can receive one or more inputs selecting particular preferences with regard to a group and/or cluster of groups. The one or more inputs can be related to sources, locations, keywords, descriptions, topics (e.g., user interests, projects, etc.), and the like. For example, the user interface may receive inputs to generate a group of messages from a selection of senders who are co-workers on a particular work project. In such an example, the user interface may receive the input of the particular people associated with the work project, as well as a keyword or title of the work project. For another example, the user interface may receive user preferences to generate a cluster of groups including work groups for a plurality of projects in which the user is a part. In such an example, the user interface may receive an input to generate each of the groups, as well as a relation between each of the groups.

Additionally or alternatively, the groups and/or clusters of groups can be generated by applying system settings. In various examples, the system settings can generate groups and/or clusters of groups based on keywords, domain names related to messages, existing conversations, user-tagged content, user contacts, frequently accessed social media sites, and the like. For example, the system settings can automatically group together senders from a particular domain, such as @mywork.com, and generate a work group based on the domain.

At block 404, the computing system can generate a utility function. The utility function can be applied to a group and/or across groups in a cluster. In various examples, the utility function can be a parameterized equation. In some examples, the parameters of the utility function can be generated and/or derived from user preferences. The user preferences can be related to a current region, a current location, an intended destination, a time of day, a day of week and/or month, a sender, a group to which the message is associated, an urgency of the message, and/or other prioritization preferences.

In various examples, the parameters of the utility function can be generated and/or derived from the system settings. In such examples, the system settings can be related to a type of message, an urgency of the message, an indication of priority, content in the message, a time of day, a day of the week, user-tagged content, events associated with the message, and the like. For example, the system settings may include a parameter that automatically results in an electronic mail message getting a higher utility than a blog post message. For another example, the system settings may include a parameter that assigns a higher utility to a message containing an invitation for an event than to a message not containing an invitation.

At block 406, the computing system can receive a message. The message can be in the form of an electronic mail (email), a text message, a conversation message, a blog message, a social media message, an instant message, a publication, or other type of message. The message can be received into (e.g., associated with, assigned to, etc.) a group and/or a cluster of groups.

At block 408, the computing system can calculate the utility of the message. The utility of the message can represent a relevance to the user of the computing system of the particular message. The utility of the message can be calculated by applying a utility function generated at 404 to the message. In some examples, the message can be evaluated to determine the existence of parameters relevant to the utility function. Values of the parameters can be applied to the utility function to produce the result of the utility of the message at 408.

At block 410, the computing system can cause an indication of the message to be displayed on a computing device. In some examples, the message can be displayed in a messaging interface, such as the messaging user interface depicted in FIG. 9. The indication of the message can be an alert, a notification, a symbol of a number of unread messages, etc. In some examples, the indication of the message can include at least part of the content of the message.

Figure 5:
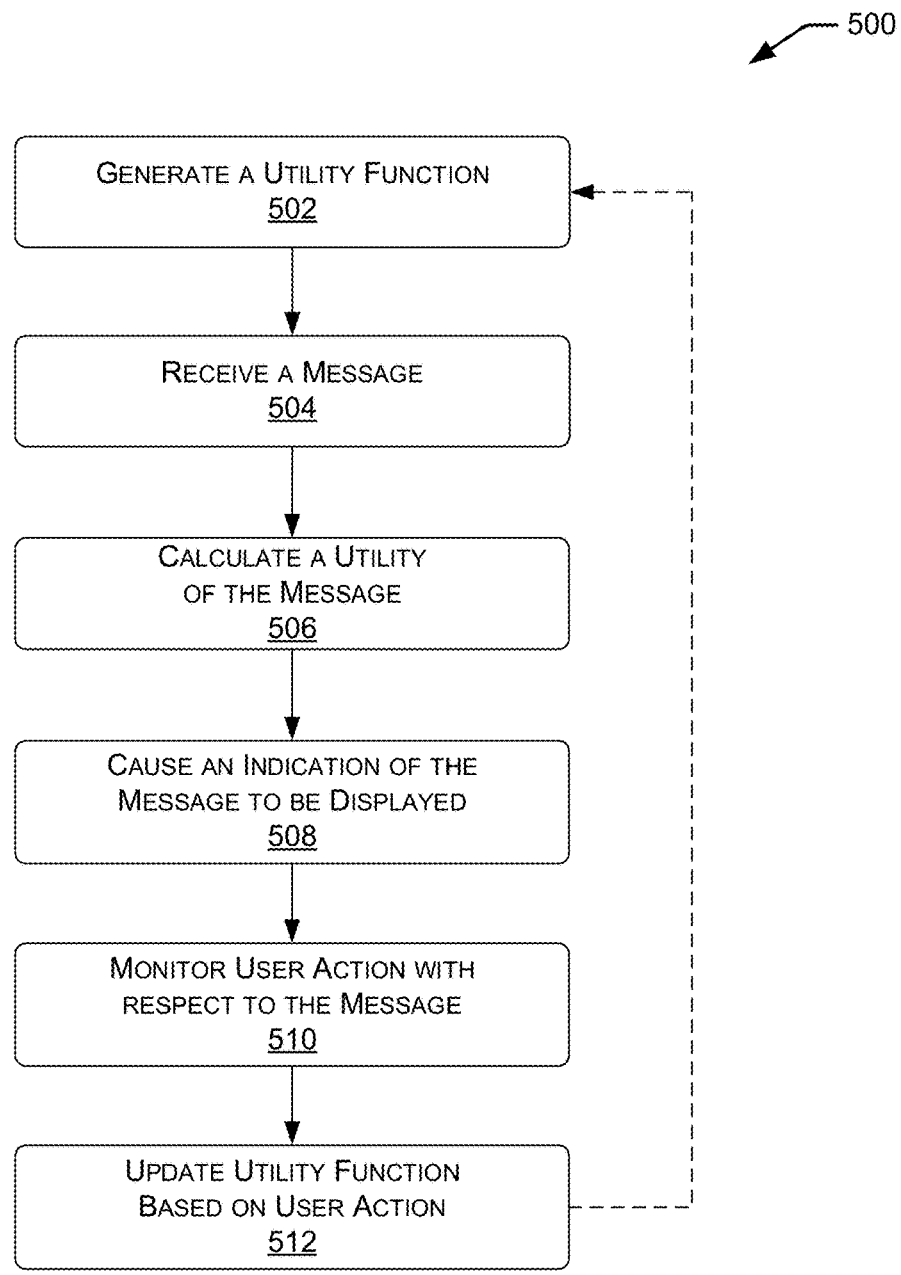
FIG. 5 is a flow diagram that illustrates an example process flow of training a utility function of a message grouping and relevance system.

FIG. 5 is a flow diagram that illustrates an example process flow 500 of training a utility function of a message grouping and relevance system.

At block 502, the computing system can generate a utility function. The utility function can be applied to a group and/or across groups in a cluster. In various examples, the utility function can be a parameterized equation. In some examples, the parameters of the utility function can be generated and/or derived from user preferences. The user preferences can be related to a current region, a current location, an intended destination, a time of day, a day of week and/or month, a sender, a group to which the message is associated, an urgency of the message, and/or other prioritization preferences.

In various examples, the parameters of the utility function can be generated and/or derived from the system settings. In such examples, the system settings can be related to a type of message, an urgency of the message, an indication of priority, content in the message, a time of day, a day of the week, user-tagged content, events associated with the message, and the like. For example, the system settings may include a parameter that automatically results in an electronic mail message getting a higher utility than a blog post message. For another example, the system settings may include a parameter that associates a higher utility for a message containing an invitation for an event.

At block 504, the computing system can receive a message. The message can be in the form of an electronic mail (email), a text message, a conversation message, a blog message, a social media message, an instant message, a publication, or other type of message. The message can be received into (e.g., associated with, assigned to, etc.) a group and/or a cluster of groups.

At block 506, the computing system can calculate the utility of the message. The utility of the message can represent a relevance to the user of the computing system of the particular message. The utility of the message can be calculated by applying a utility function generated at 502 to the message. In some examples, the message can be evaluated to determine the existence of parameters relevant to the utility function. Values of the parameters can be applied to the utility function to produce the result of the utility of the message at 506.

At block 508, the computing system can cause an indication of the message to be displayed on a computing device. In some examples, the message can be displayed in a messaging interface. The indication of the message can be an alert, a notification, a symbol of a number of unread messages, etc. In some examples, the indication of the message can include at least part of the content of the message.

At block 510, the computing system can monitor user action with respect to the message. The user action can include a selection of the message, a length of time the message remained un-read, a disregard of the message, a categorization of the message, a follow-up of the message, a post-receipt message prioritization, and the like. The user action can be received via one or more I/O interfaces.

At block 512, the computing system can update a utility function based on user action. In various examples, the computing system can apply machine learning to update and/or train the utility function generated at 502. In such examples, the computing system can adjust the parameters of the utility function based on the user action with respect to the message. For example, the computing system may update a parameter of a utility function based on detection of a user consistently selecting messages from a particular sender before other messages. Responsive to such a detection of user preference, a parameter of the utility function can be added and/or adjusted to increase the utilities of messages from the particular sender.

Figure 6:
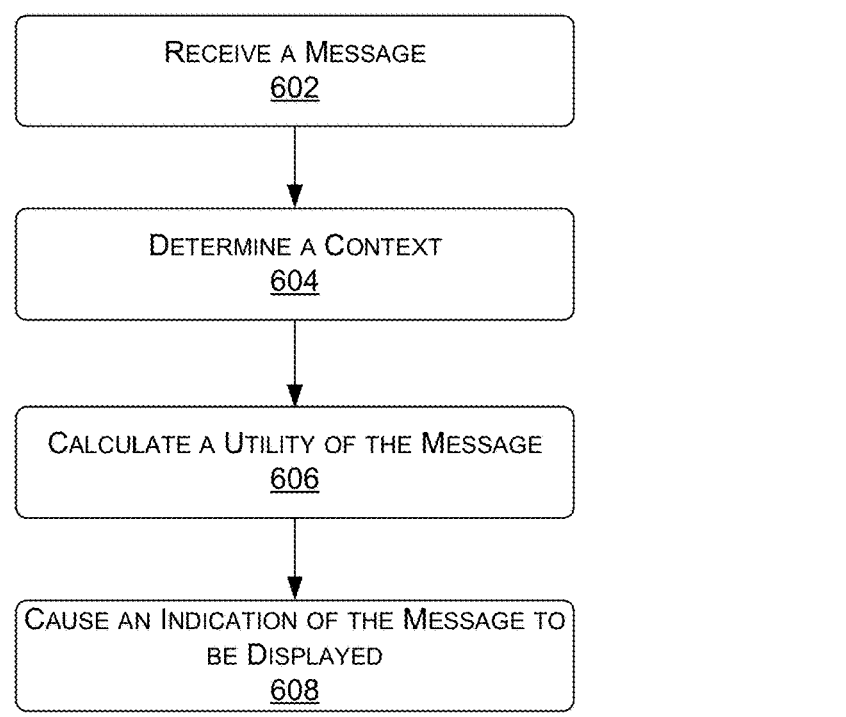
FIG. 6 is a flow diagram that illustrates an example process flow of calculating a message utility based at least in part on a context of a message in a message grouping and relevance system.

FIG. 6 is a flow diagram that illustrates an example process flow 600 of calculating a message utility based at least in part on a context of a message in a message grouping and relevance system.

At block 602, the computing system can receive a message. The message can be in the form of an electronic mail (email), a text message, a conversation message, a blog message, a social media message, an instant message, a publication, or other type of message. The message can be received into (e.g., associated with, assigned to, etc.) a group and/or a cluster of groups.

At block 604, the computing system can determine a message context. The message context can be a time of day in which the message is received, a sender, a geo-location of recipient, a geo-location of the sender, a message urgency, etc. In some examples, the computing system can determine the message context by evaluating the message.

At block 606, the computing system can determine a utility of the message by applying the message to one or more utility functions. The one or more utility functions can be parameterized equations. In various examples, the one or more utility functions can include parameters related to the context of the message. In such examples, the utility of the message can be based at least in part on the message context determined at 604. In some examples, the parameters of the one or more utility functions can be based on user preferences and/or system settings.

At block 608, the computing system can cause an indication of the message to be displayed. In various examples, the computing system can cause the indication of the message to be displayed on a display of a computing device. In some examples, the message can be displayed in a messaging interface. The indication of the message can be an alert, a notification, a symbol of a number of unread messages, etc. In some examples, the indication of the message can include at least part of the content of the message.

In various examples, the indication of the message can be based at least in part on the utility of the message. In some examples, the indication of the message can be displayed if the utility of the message is above a threshold utility. In some examples, the indication of the message can be displayed based on a determination that the utility is among a top ranked set of messages.

Figure 7:
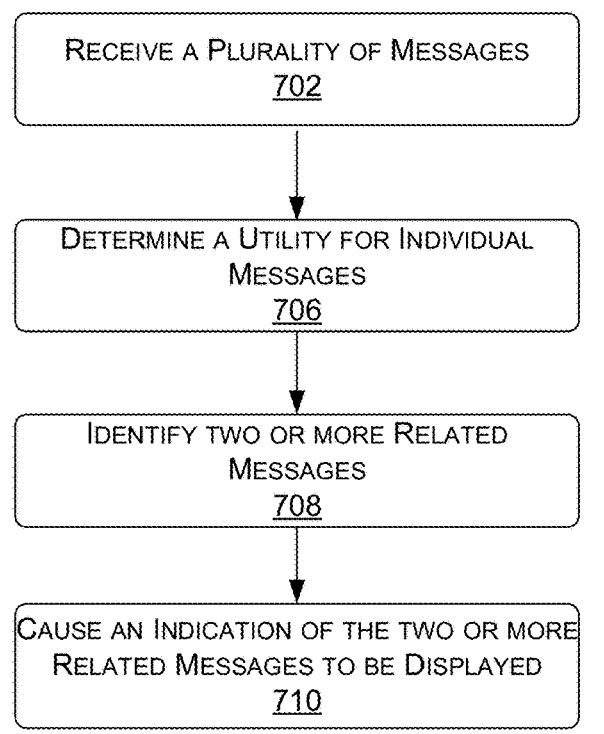
FIG. 7 is a flow diagram that illustrates an example process flow of grouping messages based on a relation between two or more messages in a message grouping and relevance system.

FIG. 7 is a flow diagram that illustrates an example process flow 700 of grouping messages based on a relation between two or more messages in a message grouping and relevance system.

At block 702, the computing system can receive a plurality of messages. The messages can be in the form of one or more of an electronic mail (email), a text message, a conversation message, a blog message, a social media message, an instant message, a publication, or other type of message. The messages can be received into (e.g., associated with, assigned to, etc.) a group and/or a cluster of groups.

At block 704, the computing system can determine a utility for individual messages. In various examples, the utility for individual messages can be determined based on one or more utility functions. The one or more utility functions can be associated with a group and/or a cluster of groups with which the message is associated. In various examples, the one or more utility functions can be parameterized equations. In some examples, the parameters of the one or more utility functions can be generated and/or derived from user preferences. The user preferences can be related to a current region, a current location, an intended destination, a time of day, a day of week and/or month, a sender, a group to which the message is associated, an urgency of the message, and/or other prioritization preferences.

In various examples, the parameters of the one or more utility functions can be generated and/or derived from system settings. In such examples, the system settings can be related to a type of message, an urgency of the message, an indication of priority, content in the message, a time of day, a day of the week, user-tagged content, events associated with the message, and the like. For example, the system settings may include a parameter that automatically results in an electronic mail message getting a higher utility than a blog post message. For another example, the system settings may include a parameter that associates a higher utility for a message containing an invite for an event.

At block 706, the computing system can identify two or more related messages. Two or more messages can be related based on a common topic, keyword, conversation, sender, and the like. In various examples, responsive to a determination of relatedness between two or more messages, the utility of the related messages can be increased, to increase the likelihood that a user will be alerted to its receipt. For example, if the computing system determines that two messages are related, such as two messages in the same conversation, the computing system may increase the utility of the messages based on the relation.

At block 708, the computing system can cause an indication of the two or more related messages to be displayed. In some examples, the two or more messages can be displayed in a messaging interface. The indication of the messages can be an alert, a notification, a symbol of a number of unread messages, etc. In some examples, the indication of the messages can include at least part of the content of the one or more of the messages. In some examples, the indication of the messages can include a keyword associated with the two or more related messages.

In various examples, the indication of the messages can be based at least in part on the utility of the messages. In some examples, the indication of the messages can be displayed if the utility of the messages is above a threshold utility. In some examples, the indication of the messages can be displayed based on a determination that the respective utilities are among a top ranked set of messages.

Figure 8:
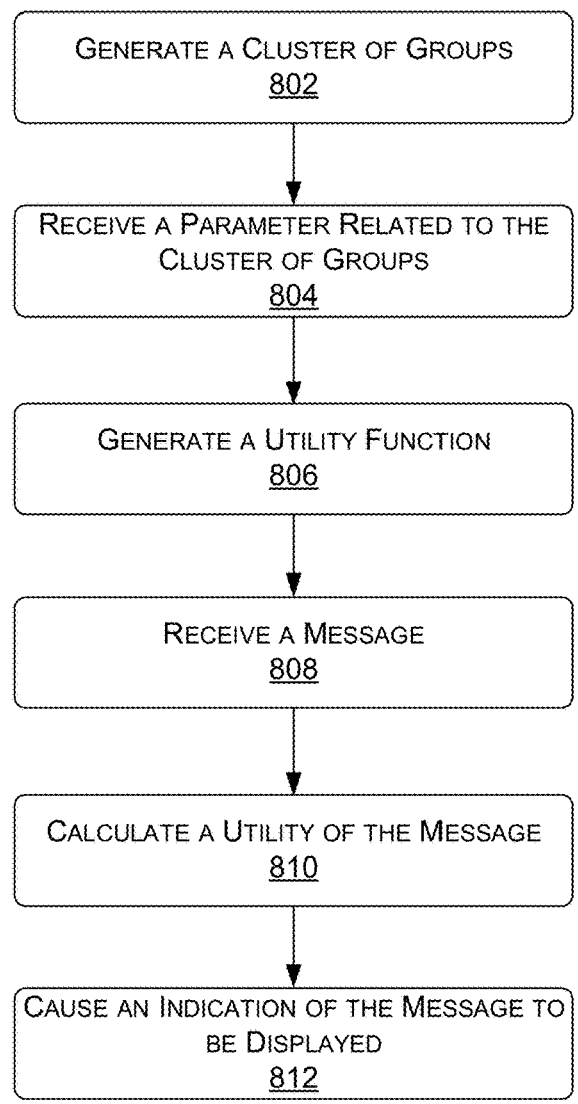
FIG. 8 is a flow diagram that illustrates an example process flow of generating a utility function based on user defined parameters in a message grouping and relevance system.

FIG. 8 is a flow diagram that illustrates an example process flow 800 of generating a utility function based on user defined parameters in a message grouping and relevance system.

At block 802, the computing system can generate a cluster of groups. In various examples, the groups and/or clusters of groups can be generated by applying user preferences and/or system settings. In some examples, the groups and/or clusters of groups can be generated via a user interface. In such examples, the user interface can receive one or more inputs selecting particular preferences with regard to a group and/or cluster of groups. The one or more inputs can be related to sources, locations, keywords, descriptions, topics, (e.g., user interests, projects, etc.), and the like. For example, the user interface may receive inputs to generate a group of messages from a selection of senders who are co-workers on a particular work project. In such an example, the user interface may receive the input of the particular people associated with the work project, as well as a keyword or title of the work project. For another example, the user interface may receive user preferences to generate a cluster of groups including work groups for a plurality of projects in which the user is a part. In such an example, the user interface may receive an input to generate each of the groups, as well as a relation between each of the groups.

Additionally or alternatively, the groups and/or clusters of groups can be generated by applying system settings. In various examples, the system settings can generate groups and/or clusters of groups based on keywords, domain names related to messages, existing conversations, user-tagged content, user contacts, frequently accessed social media sites, and the like. For example, the system settings can automatically group together senders from a particular domain, such as @mywork.com, and generate a work group based on the domain.

At block 804, the computing system can receive a parameter related to the cluster of groups. In various examples, the parameter can be generated and/or derived from user preferences. The user preferences can be related to a current region, a current location, an intended destination, a time of day, a day of week and/or month, a sender, a group to which the message is associated, an urgency of the message, and/or other prioritization preferences. In some examples, the parameter can be generated and/or derived from system settings. In such examples, the system settings can be related to a type of message, an urgency of the message, an indication of priority, content in the message, a time of day, a day of the week, user-tagged content, events associated with the message, and the like. For example, the system settings may include a parameter that automatically results in an electronic mail message getting a higher utility than a blog post message. For another example, the system settings may include a parameter that associates a higher utility for a message containing an invitation for an event.

At block 806, the computing system can generate a utility function. The utility function can be applied to a group and/or across groups in a cluster. In various examples, the utility function can be a parameterized equation, based at least in part on the parameter received at 804.

At block 808, the computing system can receive a message. The message can be in the form of an electronic mail (email), a text message, a conversation message, a blog message, a social media message, an instant message, a publication, or other type of message. The message can be received into (e.g., associated with, assigned to, etc.) a group and/or a cluster of groups.

At block 810, the computing system can calculate the utility of the message. The utility of the message can represent a relevance to the user of the computing system of the particular message. The utility of the message can be calculated by applying a utility function generated at 806 to the message. In some examples, the message can be evaluated to determine the existence of parameters relevant to the utility function. Values of the parameters can be applied to the utility function to produce the result of the utility of the message at 810.

At block 812, the computing system can cause an indication of the message to be displayed on a computing device. In some examples, the message can be displayed in a messaging interface. The indication of the message can be an alert, a notification, a symbol of a number of unread messages, etc. In some examples, the indication of the message can include at least part of the content of the message.

Example Interfaces

Figure 9:
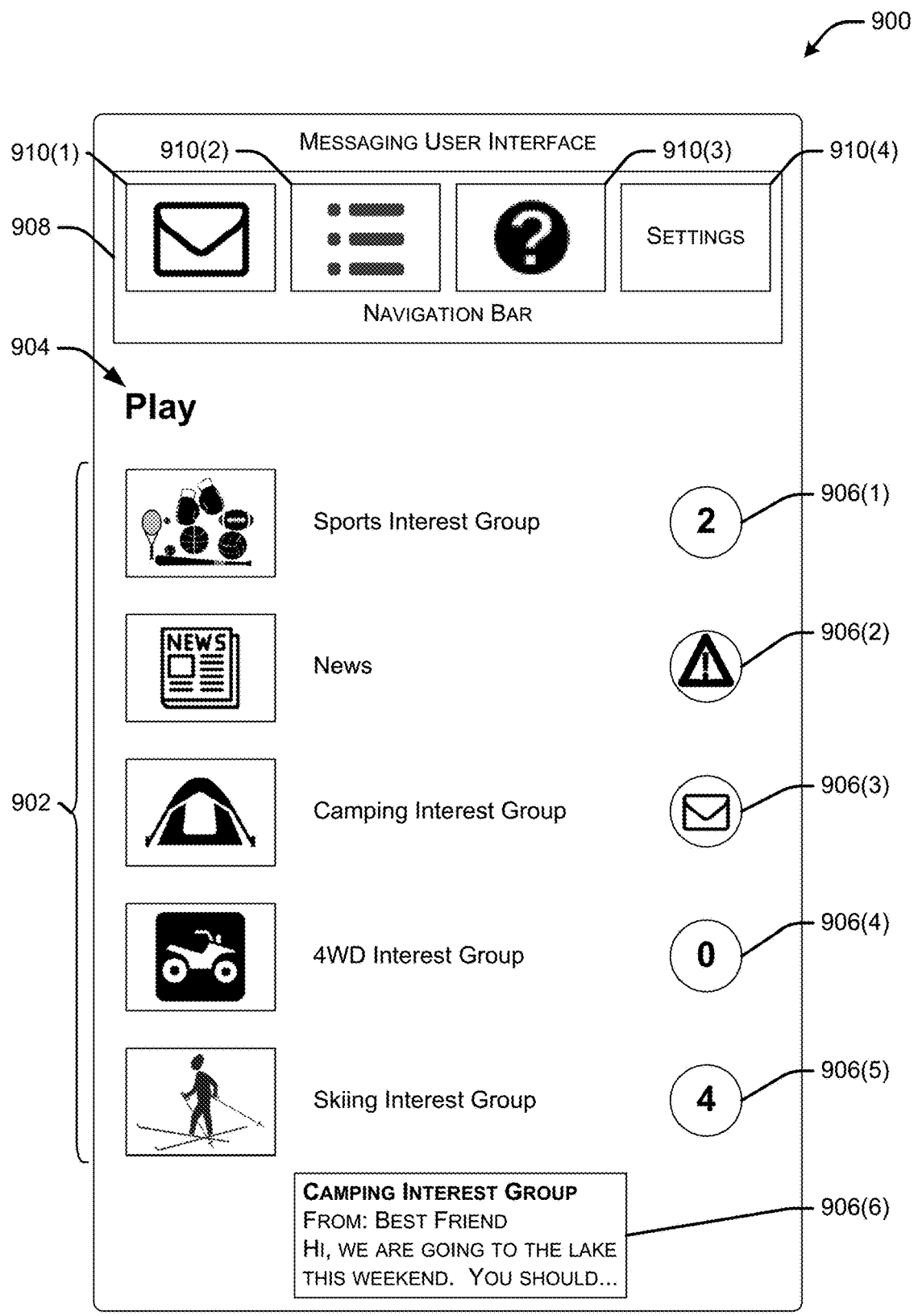
FIG. 9 illustrates an example messaging user interface used in a message grouping and relevance system consistent with the preceding figures.

FIG. 9 illustrates an example messaging user interface 900 used in a message grouping and relevance system consistent with the preceding figures. In some examples, the messaging user interface 900 can provide a means by which the message grouping and relevance system can receive input data (e.g., a selection of the message, a length of time the message remained un-read, a disregard of the message, a categorization of the message, a follow-up of the message, a post-receipt message prioritization, etc.), such as for training one or more utility functions, groups, and/or clusters of groups.

In various examples, the messaging user interface 900 can include a cluster of groups 902. As described in further detail below with regard to FIG. 9, the groups and/or the cluster of groups can be generated via the user interface. The cluster of groups 902 can include one or more groups of interest to a user. The groups in the cluster of groups 902 can be related to one another based upon system settings (e.g., keywords, domain names related to messages, existing conversations, user-tagged content, user contacts, frequently accessed social media sites, etc.) and/or user preferences (e.g. sources, locations, keywords, descriptions, topics). In the illustrative example, the cluster of groups 902 includes a cluster of groups related to extracurricular activities of interest to the user.

In various examples, the messaging user interface 900 can open to a view of a particular cluster. In some examples, the particular cluster can be based on a user preference. For example, during business hours, the messaging user interface 900 may open to a work cluster. For another example, on the weekends, the messaging user interface 900 may open to a hobby-related cluster. In some examples, the messaging user interface 900 can open to the last cluster accessed by the user.

In some examples, the messaging user interface 900 can include a title 904 for the cluster of groups 902. In various examples, the title 904 can be generated by the messaging user interface, such as based on a keyword or topic associated with the groups in the cluster. In some examples, the user can define the title 904, such as shown here as "PLAY."

In various examples, the messaging user interface 900 can include an alert 906 for the cluster, the alert being an indication of one or more messages available in the cluster. In the illustrative example, the messaging user interface 900 can include an alert 906 for each group in the cluster, the alert being an indication of one or more messages. The alert 906 can be a message notification (e.g., 906(6)), a message icon (e.g., 906(3)), a number of relevant unread messages (e.g., 906(1)), a priority icon (e.g., 906(2)), and the like.

In various examples, the alert 906 can include a message notification, such as a pop-up message notification. In various examples, the pop-up message notification can include at least part of the context and/or contents of the message. In the illustrative example, alert 906(6) includes the group to which the message is associated, the sender of the message, and a first portion of the message. In other examples, the alert 906(6) can include more or less information.

The alerts 906 of the messaging user interface 900 can provide the user with a single access viewpoint to review all necessary and/or desired information, thus decreasing a number of individual websites and/or messaging systems a user needs to access. For example, the user, in a quick view, can view alert 906(4) and see that the 4WD interest group has no new messages. As such, the user may not need to access the particular web site to determine if any new messages have been published. Because the user need not access the website, the message grouping and relevance system can have the technical advantage of increasing an overall network bandwidth available, as the user need not access each individual site to determine the existence of updated messages. Furthermore, the message grouping and relevance system can also decrease a time required by the user on a computing device to ensure the user is up-to-date with information. Consequently, the system can result in an improvement to the functioning of the computing device by allowing more computing power to be available to process other programs. Thus, the message grouping and relevance system increases the technical efficiency of both the computer and the network because the system provides a means by which a user can quickly glean information from an interface that would otherwise require access to multiple different websites individually, thereby requiring less bandwidth and less computing power than the prior art.

In various examples, the messaging user interface 900 can include a navigation bar 908. The navigation bar 908 can include menu items 910 for navigating the messaging user interface 900. In the illustrative example, the navigation bar 908 includes menu items 910 for message creation (e.g., 910(1)), for navigating to a view of all clusters (e.g., 910(2)), for searching (e.g., 910(3)), and for editing settings (e.g., 910(4)), described in further detail with respect to FIG. 9). In other examples, the navigation bar 908 can include a greater or fewer number of menu items 910.

As illustrated in FIG. 9, the navigation bar 908 can include a message creation menu item 910(1). The message creation menu item 910(1) can provide a means by which a user can create a new message related to at least one group in the cluster. In some examples, the message drafting menu item 910(1) can provide a means by which the user can send a message to all of the members in each group of the cluster. In such examples, a message could be broadcast across the groups of the cluster.

In some examples, the navigation bar 908 can include a menu item for navigating to a view of all clusters 910(2). In such examples, the menu item for navigating to a view of all clusters 910(2) can provide a means by which a user can access a view of all of the clusters of groups. The view of all clusters of groups can include an alert per group, such as an alert indicating a total number of new messages in the cluster.

In various examples, the navigation bar 908 can include a searching menu item 910(3). In some examples, the searching menu item 910(3) can provide a means by which a user can search the cluster for messages, such as by keyword. In some examples, the searching menu item 910(3) can provide a means by which a user can perform a search on a search engine, such as an Internet search engine. In such examples, the user can search for articles, stories, etc. published that relate to a message. Additionally, in such examples, the user can search for other related groups to add to the cluster of groups. For example, a user could search for a scuba diving interest group to add to the "PLAY" cluster of groups 902, such as via the editing settings menu item 910(4). The editing settings menu item 910(4) can provide a means by which a user can edit one or more clusters of groups and/or the groups associated therewith. The editing settings menu item 910(4) is described in further detail below with regard to FIG. 10.

Figure 10:
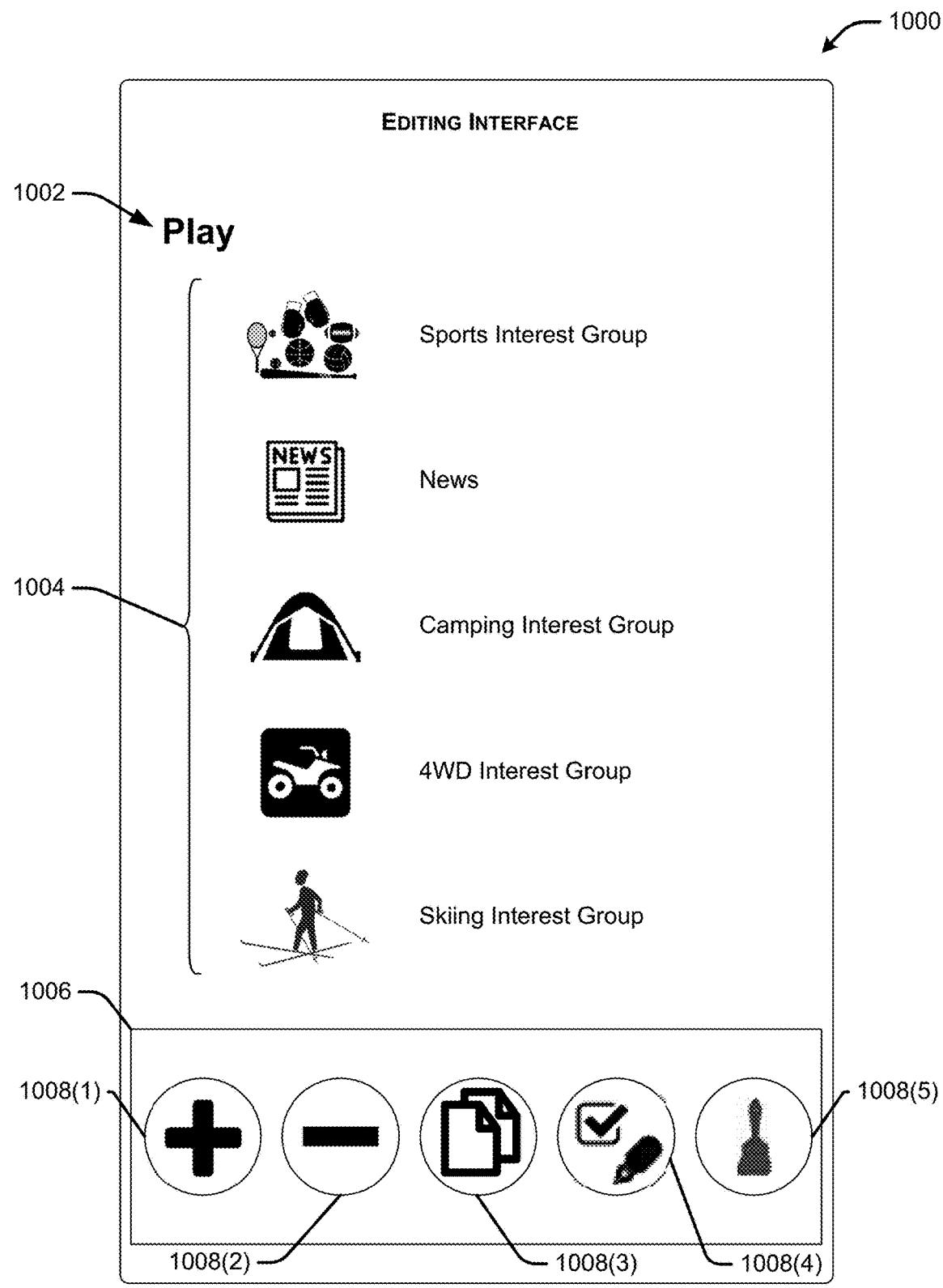
FIG. 10 illustrates an example editing interface used in a message grouping and relevance system consistent with the preceding figures.

FIG. 10 illustrates an example editing interface 1000 used in a message grouping and relevance system consistent with the preceding figures. In various examples, the editing interface 1000 can be surfaced upon selection of an editing settings menu item, such as editing settings menu item 910(4).

As illustrated in FIG. 10, the editing interface 1000 can provide a means by which a user can edit a cluster of groups and/or the groups associated therewith. Additionally, the editing interface 1000 can provide a means by which a user can edit multiple clusters of groups, such as in a bulk edit of clusters. In some examples, a name 1002 of the cluster of groups can be edited by selecting the name 1002. In various examples, the groups and/or cluster of groups can be edited by selecting one or more groups 1004 in the cluster.

In various examples, the editing interface 1000 can include an edit bar 1006. The edit bar 1006 can include menu items 1008 for editing the groups and/or cluster of groups. In the illustrative example, the edit bar 1006 includes menu items 1008 for adding groups (e.g., 1008(1)), for deleting groups (e.g., 1008(2)), for cloning groups (e.g., 1008(3)), for editing details of the group (e.g., 1008(4)), and for a bulk edit of groups (e.g., 1008(5)). In other examples, the edit bar 1006 can include a greater or fewer number of menu items 1008.

As illustrated in FIG. 10, the editing interface 1000 can include an add group menu item 1008(1) and a delete group menu item 1008(2). The add group menu item 1008(1) can include a means by which additional groups can be added to the cluster of groups. In various examples, the add group menu item 1008(1) can include a means by which the user can search for related groups (e.g., keywords, existing conversations, user-tagged content, user contacts, frequently accessed social media sites, sources, locations, descriptions, topics) to add to the cluster. The delete group menu item 1008(2) can include a means by which groups can be removed from the cluster of groups.

In various examples, the editing interface 1000 can include a clone menu item 1008(3). The cloning menu item 1008(3) can provide a means by which one or more groups can be cloned. For example, a user may wish to clone a skiing interest group, and edit the groups to reflect different ski mountains. Thus, the user may be able to quickly access conversations related to a ski mountain in which the user is interested at the moment.

In some examples, the editing interface 1000 can include an edit menu item 1008(4). The edit menu item 1008(4) can include a means by which the user can edit particular features about the group. The features can include members, icons, names, alert information, and other user preferences associated with the group.

In various examples, the editing interface 1000 can include a bulk edit menu item 1008(5). The bulk edit menu item 1008(5) can include a means by which the user can edit features of the cluster of groups. The features of the cluster can include the name 1002, icons, alert information, and other user preferences associated with the cluster of groups.
Example Clauses A: A system comprising: a processor; and a computer-readable medium storing instructions for a message relevance framework, for actuation by the processor, the message relevance framework comprising: a grouping module including instructions to configure the processor to generate a cluster of groups; a user preference module including instructions to configure the processor to receive a parameter related to the cluster of groups; a utility function module including instructions to configure the processor to: generate a utility function for the cluster of groups based at least in part on the parameter; receive a message; and calculate a utility of the message based at least in part on the utility function; and a display module including instructions to configure the processor to: cause a presentation of an indication of the message on a display of a consumer device based at least in part on the utility.

B: A system as paragraph A describes, wherein the parameter includes location data and the messaging module is further configured to determine a location of the consumer device upon receipt of the message, wherein the utility of the message is further based on the location of the consumer device.

C: A system as either of paragraphs A or B describe, wherein the parameter includes timing data and the messaging module is further configured to determine a time of day of receipt of the message, wherein the utility of the message is further based on the time of day in which the message is received.

D: A system as any of paragraphs A-C describe, further comprising a message relation module including instructions to configure the processor to: determine a relation between a first message and a second message; and adjust a first utility of the first message and a second utility of the second message based at least in part on the relation between the first message and the second message.

E: A system as any of paragraphs A-D describe, further comprising a ranking module including instructions to configure the processor to: rank a plurality of messages in the cluster of groups based at least in part on a respective utility of each message in the plurality of messages; select a set of messages based at least in part on the respective utility being above a threshold utility; and send the set of messages to the display module for presentation on the display.

F: A system as any of paragraphs A-E describe, further comprising a machine learning module including instructions to configure the processor to: monitor a user action with respect to the message; and update a respective utility function based at least in part on the user action.

G: A system as any of paragraphs A-F describe, wherein one or more of a size or a location of the indication of the message presented on the display is based at least in part on the utility H: A system as any of paragraphs A-G describe, wherein the indication of the message comprises one or more of: an audio notification of the message; a visual notification of the message; or a symbol identifying a number of unread messages.

I: A method comprising: generating a cluster of groups; generating a utility function for individual groups in the cluster of groups, wherein the utility function comprises a parameterized equation; receiving a message in a group of the cluster of groups; calculating a utility of the message based at least in part on a respective utility function of the group; and causing an indication of the message to be presented on a display of a consumer device based at least in part on the utility.

J: A method as paragraph I describes, further comprising: monitoring a user action with respect to the message; and updating the respective utility function based at least in part on the user action.

K: A method as either of paragraphs I or J describe, further comprising receiving, via a user interface on a consumer device, a parameter related to a particular group of the cluster of groups, wherein a utility function for the particular group is based at least in part on the parameter.

L: A method as paragraph K describes, wherein the parameter comprises one or more of: a geo-location of the consumer device; a geo-location of a sender of the message; a time of day in which the message is received; a day in a week in which the message is received; a keyword in a content of the message; or an event associated with the message.

M: A method as any of paragraphs I-L describe, further comprising receiving, via a user interface on a consumer device, a parameter related to the cluster of groups, wherein the utility function for individual groups is based at least in part on the parameter.

N: A method as any of paragraphs I-M describe, further comprising receiving, via a user interface on a consumer device, a parameter related to a particular group of the cluster of groups, wherein the parameter comprises a user preference with respect to messages in the particular group.

O: A method as any of paragraphs I-N describe wherein the generating the cluster of groups is based on at least one of a system setting or a user preference.

P: A computer-readable medium having thereon computer-executable instructions that, responsive to execution, configure a computer to perform a method as any of paragraphs I-O describe.

Q: A device or system comprising: a processor; and a computer-readable medium coupled to the processor, the computer-readable medium including instructions to configure one or more devices to perform a method as any of paragraphs I-O describe.

R: A device comprising: a processor; and a computer-readable medium having thereon computer-executable instructions, the computer-executable instructions responsive to execution by the processor to configure the device to perform operations comprising: generating a cluster of groups; generating a utility function for individual groups in the cluster of groups; receiving a message in a group of the cluster of groups; calculating a utility of the message based at least in part on a respective utility function of the group; and causing an indication of the message to be presented on a display of a consumer device based at least in part on the utility.

S: A device as paragraph R describes, wherein the cluster of groups is generated based at least in part on a user preference.

T: A device as either of paragraphs R or S describe, wherein the cluster of groups is generated based at least in part on a system setting.

U: A device as any of paragraphs R-T describe, wherein the cluster of groups is generated based at least in part on individual groups in the cluster of groups comprising a similar topic.

V: A device as any of paragraphs R-T describe, the operations further comprising: monitoring a user action with respect to the message; and updating the respective utility function based at least in part on the user action.

X: A computer-readable medium having thereon computer-executable instructions, the computer-executable instructions responsive to execution configuring a device to perform operations comprising: generating a cluster of groups; generating a utility function for individual groups in the cluster of groups; receiving a message in a group of the cluster of groups; calculating a utility of the message based at least in part on a respective utility function of the group; and causing an indication of the message to be presented on a display of a consumer device based at least in part on the utility.

Y: A computer-readable medium as paragraph X describes, the operations further comprising: monitoring a user action with respect to the message; and updating the respective utility function based at least in part on the user action.

Z: A computer-readable medium as either of paragraph X or Y describe, wherein the cluster of groups is generated based at least in part on a user preference.

AA: A computer-readable medium as any of paragraphs X-Z describe, wherein the cluster of groups is generated based at least in part on a system setting.

AB: A computer-readable medium as any of paragraphs X-AA describe, wherein the cluster of groups is generated based at least in part on individual groups in the cluster of groups comprising a similar topic.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 106, 128, or 200 such as one or more internal or external CPUs or GPUs, and/or one or more pieces of hardware logic such as FPGAs, DSPs, or other types described above.

All of the methods and processes described above can be embodied in, and fully automated via, software code modules executed by one or more general purpose computers or processors. The code modules can be stored in any type of computer-readable storage medium or other computer storage device. Some or all of the methods can be embodied in specialized computer hardware.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed in a different order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system comprising:
   a processor; and
   a computer-readable medium storing instructions for a message relevance framework, for actuation by the processor, the message relevance framework comprising:
   a grouping module including instructions to configure the processor to generate a cluster of groups;
   a user preference module including instructions to configure the processor to receive a first parameter and a second parameter for each group of the cluster of groups, the first parameter being based on a user preference that indicates user-defined preference parameters applicable to a corresponding group from the cluster of groups, and the second parameter being based on a system setting;
   a utility function module including instructions to configure the processor to:
   generate a utility function for each group in the cluster of groups based at least in part on the first parameter and the second parameter;
   receive a message;
   assign the message to a group from the cluster of groups; and
   calculate a utility of the message based at least in part on the utility function generated for the group to which the message is assigned, wherein the utility of the message indicating a relevance of the message relative to other messages within the group; and
   a display module including instructions to configure the processor to:
   cause a presentation of an indication of the message on a display of a consumer device based at least in part on the utility of the message.

2. The system as claim 1 recites, wherein the first parameter includes location data, wherein the instructions in the utility function module further configure the processor to determine a location of the consumer device upon receipt of the message, wherein the utility of the message is further based on the location of the consumer device.

3. The system as claim 1 recites, wherein the first parameter includes timing data, wherein the instructions in the utility function module further configure the processor to determine a time of day of receipt of the message, wherein the utility of the message is further based on the time of day in which the message is received.

4. The system as claim 1 recites, further comprising a message relation module including instructions to configure the processor to:
   determine a relation between a first message and a second message; and
   adjust a first utility of the first message and a second utility of the second message based at least in part on the relation between the first message and the second message.

5. The system as claim 1 recites, further comprising a ranking module including instructions to configure the processor to:
   rank a plurality of messages in the cluster of groups based at least in part on a respective utility of each message in the plurality of messages;
   select a set of messages based at least in part on the respective utility being above a threshold utility; and
   send the set of messages to the display module for presentation on the display.

6. The system as claim 1 recites, further comprising a machine learning module including instructions to configure the processor to:
   monitor a user action with respect to the message; and
   update the utility function based at least in part on the user action.

7. The system as claim 1 recites, wherein one or more of a size or a location of the indication of the message presented on the display is based at least in part on the utility of the message.

8. The system as claim 1 recites, wherein the indication of the message comprises one or more of:
   an audio notification of the message;
   a visual notification of the message; or
   a symbol identifying a number of unread messages.

9. A method comprising:
generating a cluster of groups based on a first parameter and a second parameter, wherein the first parameter being based on a user preference, that is received via a user interface of a consumer device and indicates user-defined preference parameters applicable to a corresponding group from the cluster of groups, and the second parameter being based on a system setting;
generating a utility function for each group in the cluster of groups, wherein the utility function comprises a parameterized equation based on the first parameter and the second parameter;
receiving a message;
assigning the message to a group from the cluster of groups;
calculating a utility of the message based at least in part on a respective the utility function of generated for the group to which the message is assigned, the utility of the message indicating a relevance of the message relative to other messages within the group; and
causing an indication of the message to be presented on a display of the consumer device based at least in part on the utility of the message.

10. The method as claim 9 recites, further comprising:
monitoring a user action with respect to the message; and
updating the utility function based at least in part on the user action.

11. The method as claim 9 recites, wherein the second parameter comprises one or more of:
a geo-location of the consumer device;
a geo-location of a sender of message;
a time of day in which message is received;
a day in a week in which message is received;
a keyword in a content of message; or
an event associated with message.

12. The method as claim 9 recites, further comprising receiving, via a user interface on the consumer device, the first parameter related to a particular group of the cluster of groups, wherein the first parameter comprises a user preference with respect to messages in the particular group.

13. The method as claim 9 recites, wherein the system setting includes a type of message or an urgency of message.

14. A device comprising:
a processor; and
a computer-readable medium having thereon computer-executable instructions, the computer executable instructions responsive to execution by the processor to configure the device to perform operations comprising:
generating a cluster of groups based on a first parameter and a second parameter, wherein the first parameter being based on a user preference, that is received via a user interface of the device and indicates user-defined preference parameters applicable to a corresponding group from the cluster of groups, and the second parameter being based on a system setting;
generating a utility function for each group in the cluster of groups based on the first parameter and the second parameter;
receiving a message;
assigning the message to a group from the cluster of groups;
calculating a utility of the message based at least in part on the utility function generated for the group to which the message is assigned, the utility of the message indicating a relevance of the message relative to other messages within the group; and
causing an indication of the message to be presented on a display of the device based at least in part on the utility of the message.

15. The device as claim 14 recites, wherein the user preference is based on an input received from a user of the device, the input indicating at least one of a message source, a message location, and a message topic.

16. The device as claim 14 recites, wherein the system setting includes a type of message or an urgency of message.

17. The device as claim 14 recites, wherein the cluster of groups is generated based at least in part on individual groups in the cluster of groups comprising a similar topic.

18. The device as claim 14 recites, the operations further comprising:
monitoring a user action with respect to the message; and
updating the utility function based at least in part on the user action.

* * * * *